United States Patent
Corring et al.

(10) Patent No.: US 11,037,010 B2
(45) Date of Patent: Jun. 15, 2021

(54) COMPOSITIONAL MODEL FOR TEXT RECOGNITION

(71) Applicant: Microsoft Technology Licensing, LLC, Redmond, WA (US)

(72) Inventors: John Richard Corring, Bellevue, WA (US); Gang Hua, Sammamish, WA (US); Wei Tang, Evanston, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 16/245,912

(22) Filed: Jan. 11, 2019

(65) Prior Publication Data
US 2020/0226400 A1 Jul. 16, 2020

(51) Int. Cl.
| | | |
|---|---|---|
| *G06K 9/03* | (2006.01) | |
| *G06K 9/20* | (2006.01) | |
| *G06K 9/32* | (2006.01) | |
| *G06K 9/62* | (2006.01) | |
| *G06T 5/00* | (2006.01) | |

(52) U.S. Cl.
CPC ............ *G06K 9/03* (2013.01); *G06K 9/2054* (2013.01); *G06K 9/325* (2013.01); *G06K 9/6257* (2013.01); *G06K 9/6267* (2013.01); *G06T 5/002* (2013.01); *G06T 5/006* (2013.01); *G06K 2209/01* (2013.01); *G06T 2207/20081* (2013.01); *G06T 2207/20084* (2013.01)

(58) Field of Classification Search
CPC ........ G06K 9/03; G06K 9/2054; G06K 9/325; G06K 9/6257; G06K 9/6267; G06K 2209/01; G06T 5/002; G06T 5/006; G06T 2207/20081; G06T 2207/20084
See application file for complete search history.

(56) References Cited

U.S. PATENT DOCUMENTS

| | | | |
|---|---|---|---|
| 10,275,426 B1 * | 4/2019 | Cao ........................ | G06F 40/109 |
| 2005/0035193 A1 * | 2/2005 | Gustin ................... | G06Q 20/10 |
| | | | 235/379 |
| 2019/0272417 A1 * | 9/2019 | Reihl .................... | G06F 40/106 |

OTHER PUBLICATIONS

Ye, "Text Detection and Recognition in Imagery: A Survey", IEEE Transactions On Pattern Analysis and Machine Intelligence, vol. 37, No. 7, Jul. 2015 (Year: 2015).*
Papandreou et al., "Adaptive and Constrained Algorithms for Inverse Compositional Active Appearance Model Fitting", 2008 IEEE Conference on Computer Vision and Pattern Recognition (Year: 2008).*

(Continued)

*Primary Examiner* — Qian Yang

(57) ABSTRACT

Embodiments relate to a two-stage end-to-end text recognition system. The text recognition system includes a text detection stage and a text recognition stage. Images inputted to the text recognition system are provided to both the text detection stage and to the text recognition stage. The text detection stage detects text regions in the images and provides the detected regions to the text recognition stage. The text recognition stage is trained to perform geometric rectification on the text regions using the images. There is end-to-end alignment between the text detection stage and the text recognition stage. Additionally, the text detection stage and text recognition stage are each trained independent of the other.

20 Claims, 12 Drawing Sheets

(56) References Cited

OTHER PUBLICATIONS

Jaderberg et al., "Spatial Transformer Networks", Advances in Neural Information Processing Systems 28 (NIPS 2015) (Year: 2015).*

Rawls et al., "Combining Convolutional Neural Networks and LSTMs for Segmentation-Free OCR", 2017 14th IAPR International Conference on Document Analysis and Recognition (Year: 2017).*

Bai, et al., "Edit Probability for Scene Text Recognition", In Proceedings of the IEEE Conference on Computer Vision and Pattern Recognition, Jun. 18, 2018, pp. 1508-1516.

Bledsoe, et al., "Pattern Recognition and Reading by Machine", In Proceedings of the Eastern Joint Computer Conference, Dec. 1, 1959, pp. 225-232.

Chen, et al., "Supervised Transformer Network for Efficient Face Detection", In Proceedings of the European Conference on Computer Vision, Oct. 11, 2016, 17 Pages.

Chui, et al., "A New Point Matching Algorithm for Non-Rigid Registration", In Journal of Computer Vision and Image Understanding, vol. 89, Issues 2-3, Feb. 2003, pp. 114-141.

Dai, et al., "Autonomous Document Cleaning—A Generative Approach to Reconstruct Strongly Corrupted Scanned Texts", In Journal of IEEE Transactions on Pattern Analysis and Machine Intelligence ( vol. 36 , Issue 10, Oct. 1, 2014, pp. 1950-1962.

Graves, et al., "Connectionist Temporal Classification: Labelling Unsegmented Sequence Data with Recurrent Neural Networks", In Proceedings of the 23rd International Conference on Machine Learning, Jun. 25, 2006, pp. 369-376.

He, et al., "Deep Residual Learning for Image Recognition", In Proceedings of the IEEE Conference on Computer Vision and Pattern Recognition, Jun. 27, 2016, pp. 770-778.

He, et al., "Reading Scene Text in Deep Convolutional Sequences", In Proceedings of the Thirtieth AAAI Conference on Artificial Intelligence, Mar. 5, 2016, pp. 3501-3508.

HOCHREITER, et al., "Long Short-Term Memory", In the Journal of Neural Computation, vol. 9, Issue 8, Nov. 15, 1997, pp. 1-32.

Huang, et al., "Learning to Align from Scratch", In Proceedings of the 26th Annual Conference on Neural Information Processing Systems, Dec. 3, 2012, 09 Pages.

Huang, et al., "Unsupervised Joint Alignment of Complex Images", In Proceedings of the IEEE 11th International Conference on Computer Vision, Oct. 14, 2007, 08 Pages.

Jaderberg, et al., "Spatial Transformer Networks", In Proceedings of Advances in Neural Information Processing Systems, Dec. 7, 2015, 9 Pages.

Kopec, et al., "Document Image Decoding", In Proceedings of International Conference on Image Processing, Nov. 13, 1994, pp. 36-40.

Krizhevsky, et al., "ImageNet Classification with Deep Convolutional Neural Networks", In Proceedings of The 26th Annual Conference on Neural Information Processing Systems, Dec. 3, 2012, 9 Pages.

Lee, et al. "A New Methodology Forgray-Scale Character Segmentation and Recognition", IEEE Transactions on Pattern Analysis and Machine Intelligence vol. 18 , Issue 10, Oct. 1996, pp. 1045-1050.

Liao, et al., "TextBoxes++: A Single-Shot Oriented Scene Text Detector", In Journal of IEEE Transactions on Image Processing vol. 27, Issue 8, Aug. 2018, pp. 3676-3690.

Lin, et al. "Inverse Compositional Spatial Transformer Networks", In Proceedings of the IEEE Conference on Computer Vision and Pattern Recognition, Jul. 21, 2017, pp. 2568-2576.

Liu, et al. "Char-Net: A Character-Aware Neural Network for Distorted Scene Text Recognition", In Proceedings of Thirty-Second AAAI Conference on Artificial Intelligence, Apr. 27, 2018, pp. 7154-7161.

Liu, et al. "FOTS: Fast Oriented Text Spotting with a Unified Network", In Proceedings of the IEEE Conference on Computer Vision and Pattern Recognition, Jun. 18, 2018, pp. 5676-5685.

Liu, et al., "STAR-Net: A SpaTial Attention Residue Network for Scene Text Recognition", In Proceedings of the British Machine Vision Conference, Sep. 19, 2016, 13 Pages.

Ma, "Arbitrary-Oriented Scene Text Detection via Rotation Proposals", In Journal of Computing Research Repository, Mar. 3, 2017, 9 Pages.

Mikolajczyk, et al., "A Comparison of Affine Region Detectors", In International Journal of Computer Vision, vol. 65, No. 1-2, Oct. 14, 2005, pp. 43-72.

Phan, et al., "A Gradient Vector Flow-Based Method for Video Character Segmentation", In Proceedings of International Conference on Document Analysis and Recognition, Sep. 18, 2011, pp. 1024-1028.

Phan, et al., "Recognizing Text with Perspective Distortion in Natural Scenes", In Proceedings of the IEEE International Conference on Computer Vision, Dec. 1, 2013, pp. 569-576.

Shi, et al., "An End-to-End Trainable Neural Network for Image-Based Sequence Recognition and Its Application to Scene Text Recognition", In Journal of Computing Research Repository, Jul. 21, 2015, 09 Pages.

Shi, et al., "Robust Scene Text Recognition with Automatic Rectification", In Proceedings of the IEEE Conference on Computer Vision and Pattern Recognition, Jun. 27, 2016, pp. 4168-4176.

Viola, et al., "Alignment by Maximization of Mutual Information", In International Journal of Computer Vision, vol. 24, Issue 2, Sep. 1997, pp. 137-154.

Zhong, et al., "An Anchor-Free Region Proposal Network for Faster R-CNN based Text Detection Approaches", In Journal of Computing Research Repository, Apr. 24, 2018, 08 Pages.

Zhou, et al., "Oriented Response Networks", In Proceedings of the IEEE Conference on Computer Vision and Pattern Recognition, pp. 519-528, Jul. 21, 2017.

Zhu et al. "A Stochastic Grammar of Images", In Journal of Foundations and Trends in Computer Graphics and Vision, vol. 2, Issue 4, Jan. 29, 2006, pp. 259-362.

Zhu, et al., "Recursive Compositional Models for Vision: Description and Review of Recent Work", In Journal of Mathematical Imaging and Vision, vol. 41, Issue 1-2, Sep. 1, 2011, 29 Pages.

"International Search Report and Written Opinion Issued in PCT Application No. PCT/US2019/067629", dated Apr. 14, 2020, 24 Pages.

Tang, et al., "A Compositional Textual Model for Recognition of Imperfect Word Image", In Journal of Computing Research Repository, Nov. 27, 2018, 08 Pages.

* cited by examiner

190

| Model | Generic | Weak | Strong |
|---|---|---|---|
| Baseline | .798 | .847 | .861 |
| Full | .824 | .862 | .872 |
| Full-SSD | .800 | .848 | .860 |
| Full-STN | .804 | .856 | .869 |
| Full-STN+MSER | .641 | .765 | .763 |
| Full-kLSTM | .800 | .854 | .868 |

| ALGORITHM | IC-13 | IC-IST |
|---|---|---|
| CRNN | 86.7 | - |
| RARE | 88.6 | - |
| STAR-NET | 89.1 | - |
| CHAR-NET | 90.8 | 60.0 |
| INVENTION | 89.4 | 65.0 |

| ALGORITHM | ICDAR-FOCUSED | | | ICDAR INCIDENTAL | | |
|---|---|---|---|---|---|---|
| | G | W | S | G | W | S |
| TEXTBOXSES++ | 84.8 | 92.0 | 93.0 | 51.9 | 65.9 | 73.3 |
| RRPN | 83.9 | 89.7 | 91.6 | - | - | 32.6 |
| FOTS 2 STAGE | 80.8 | 87.0 | 87.8 | 58.2 | 77.7 | 80.4 |
| FOTS MS | 84.8 | 90.1 | 92.0 | 65.3 | 79.1 | 83.6 |
| INVENTION | 85.1 | 88.5 | 89.0 | 57.7 | 72.4 | 75.6 |

FIG. 10

COMPOSITIONAL MODEL FOR TEXT RECOGNITION

BACKGROUND

Automated visual text recognition is a fundamental problem of computer vision. Over the years numerous approaches have been used. More recently, machine learning techniques have been applied to solve this problem. While machine learning techniques have been effective at recognition, they do have shortcomings. The typical approach for machine learning recognition is to have a detector that detects a region in an image that contains text. The detector then passes the region to a recognizer, which attempts to recognize the text in the region. Detectors lack the sophistication of recognizers and often detect inaccurate regions. Parts of letters are often truncated, and spatial transforms and distortions may compound the inaccuracy of detection. And yet recognizers have had no ability to adjust the detection region; omitted or distorted imagery may remain out of the recognizer's purview. There remains a need to improve detection of text with respect to systems for machine-learning based text recognition.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to a two-stage end-to-end text recognition system. The text recognition system includes a text detection stage and a text recognition stage. Images inputted to the text recognition system are provided to both the text detection stage and to the text recognition stage. The text detection stage detects text regions in the images and provides the detected regions to the text recognition stage. The text recognition stage is trained to perform geometric rectification on the text regions using the images. There is end-to-end alignment between the text detection stage and the text recognition stage. Additionally, the text detection stage and text recognition stage are each trained independent of the other.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 6 shows test scores.

FIG. 9 shows comparative results on recognition tasks.

FIG. 10 shows end-to-end comparative performance results.

DETAILED DESCRIPTION

Overview

Figure 1:
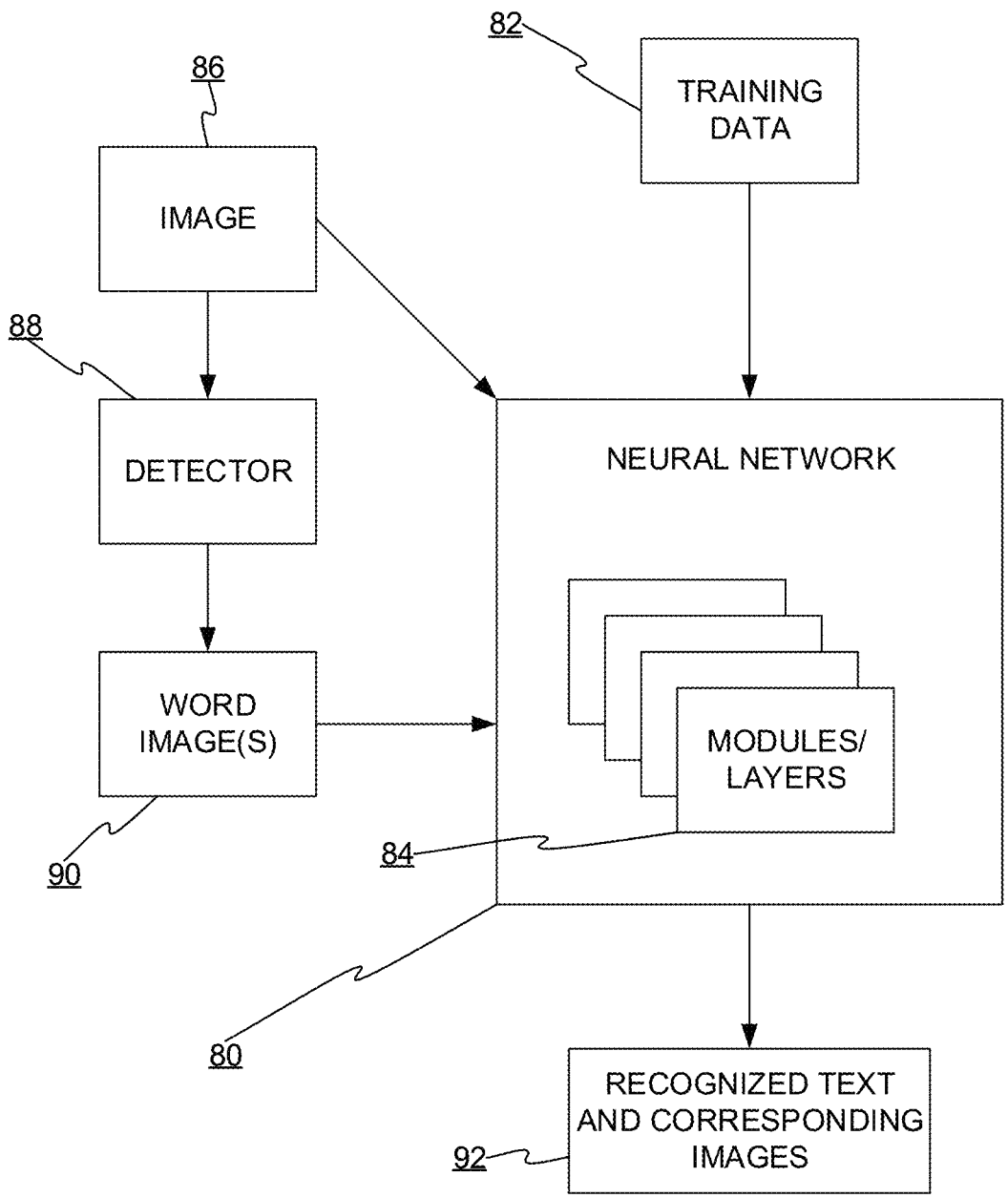
FIG. 1 shows a neural network.

Core to the problem of text recognition are the degrees of variation within the word image construction process itself: what kind of font is used, with what kerning (spacing), on what surface, etc. These considerations have not been explored specifically for the problem of text or word image recognition.

Embodiments described herein model inverse inference for the word image construction process using deep neural networks. A compositional model for formation of a word image is set forth below. The compositional model is a composition of components that are involved in respective steps of word image formation. Discussion of this model is followed by description of modules to invert respective components in the compositional model. While the model and its inversion are new, compositional modeling in general has not previously been applied to the new regime of recognition algorithms that are based on connectionist temporal classification (CTC). Although, it should be noted that the techniques described herein are not focused on generative modeling but rather on the backward inference task of recognizing the text in an image.

The most successful recognition techniques stem from formulation of inference loss by means of CTC. CTC solves the many-to-many problem of sequence modeling by decoding predictions with dynamic programming. Although alternatives such as edit probability decoding have arisen recently, embodiments are described herein with reference to CTC-based decoding. Nonetheless, the principles described herein can be readily adapted to most segmentation-free decoding strategies.

With the recent adaptation of the segmentation-free framework of CTC, the variation of kerning or character segmentation within word images has not previously been appreciated or explored. Moreover, modeling of geometric nuisances has only recently been considered for deep learning frameworks. In the current trend of text recognition, few have explored canonical alignment of word images. Furthermore, character-based alignment suffers from the segmentation problem, which the CTC approach is designed to avoid. Thus, the techniques described herein for addressing the character alignment problem are intuitively unappealing, since failure to segment correctly will limit the registration and thus the recognition. The inventors are the first to model both the geometric noise of the text and the noise of the detector, which is well suited for 2-stage end-to-end text recognition systems.

It should be noted that the embodiments described herein are focused on a second stage (recognition) that works well independent of the first stage (detection). The text recognition embodiments disclosed herein provide a more robust 2-stage pipeline, as shown by empirical test results that are discussed below.

The embodiments described herein stem from a new model for text recognition that enables end-to-end alignment between the recognizer and a detector that is trained independently. The embodiments are the first to show that a template reconstruction loss can be used to stabilize the training of spatial transformer networks for text recognition, thus enabling a single joint training.

The embodiments described herein are based on the first complete and concise compositional model for word image formation applied to the text recognition problem. The embodiments can be used for end-to-end ground truth that has different levels of precision (axis aligned, oriented bounding box, or quadrilateral) all in the same data set. Furthermore, the embodiments are competitive with state-of-the-art recognizers, can be plugged into detectors trained independently, and yield top-notch end-to-end performance.

FIG. 1 shows a neural network 80 configured in accordance with embodiments described herein for text recognition. Initially, the neural network 80 is trained with training data 82. The training data 82 comprises word images and their respective ground truth text equivalents. The training algorithm need not receive rectified boxes, and the the boxes/boundaries may be of heterogeneous types (e.g. some are rectangles, and some are quadrilaterals), but the boxes are to have the correct word transcriptions corresponding to them. The neural network 80 includes implicit layers or modules 84. The parameters of the nodes of the neural network and the weights of their connections are set by the training data 82. The trained neural network 80 is then used for text recognition. An input image 86 is passed to a detector 88 as well as to the neural network 80. The detector 88 detects a word image 90 in the input image and outputs a boundary of the word image (e.g., bounding box coordinates) to the neural network 80. The input image 86 is also passed to the neural network 80. The neural network 80 processes the word image from the detector using the input image 86. As the word image passes through the layers or modules of the neural network the boundary of the word image is adjusted (e.g. expanded) according to the trained state of the neural network 80. That is, the neural network 80 both rectifies (spatially transforms) the word image and recognizes the text in the rectified word image. The rectification may remove perspective distortion from the inputted (detected) word image, enlarge the word image, etc. The neural network 80 outputs recognized text 92 and optionally the word image as rectified by the neural network 80.

Forward Compositional Text Model

Figure 2:
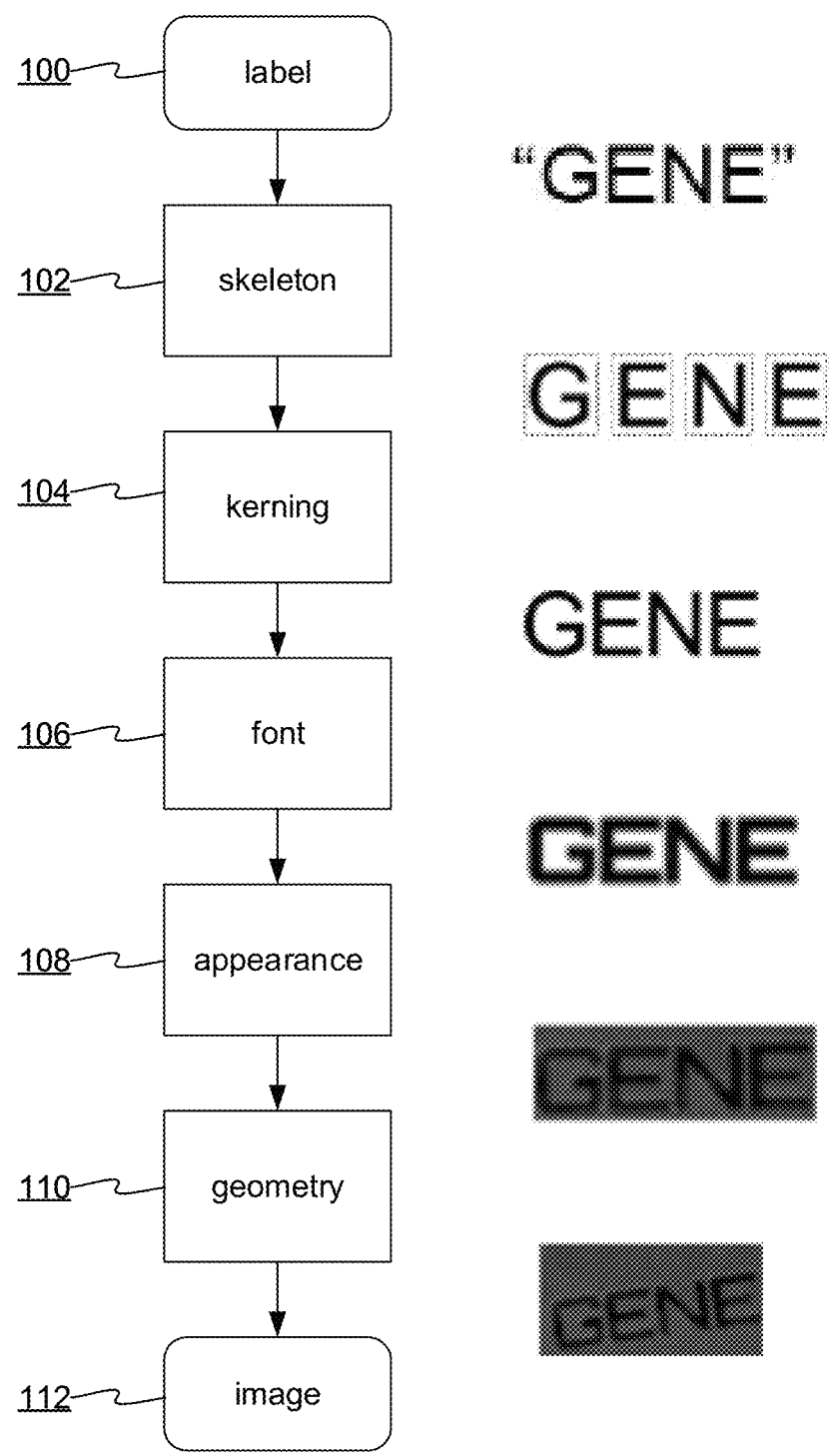
FIG. 2 shows a compositional model.

As noted above, rectification and recognition can leverage an explicit decomposition of the text formation process. One approach involves five distinct steps, not all of which are necessary: transcription and skeletonization; kerning; typesetting (font); lighting, shading, and background distortion (appearance); and geometric distortion. FIG. 2 shows a compositional model of the text generation process that an inference network can be correspondingly modeled on. Starting with a word or label 100, e.g., "GENE", the label is first passed to a skeletonization function 102 that skeletonizes the label. A kerning function 104 is applied to the skeletonization of the label, and the kerned version is then passed to a font function 106 that applies a font. An appearance function 108 may render the output from the font module 106, and a geometric distortion function 110 applies some geometric transforms (e.g., affine) to produce a word image 112. The word image 112 conceptually corresponds to a digital image of a physical rendering of the label word.

Below, each step in this text formation process is modeled. Moreover, further below is discussion of performed ablation studies showing improved performance over the CRNN (convolutional recurrent neural network) baseline. As discussion proceeds, it should be considered that the compositional model is inverted, thus inverting the text rendering process in a way that is suitable for neural networks. Although each component in the model is described in its forward form, the task is ultimately formalized in terms of the inversion of these components.

Transcription and Skeletonization

Together, the transcription, skeletonization, font, and kerning parameters of a word image are the intrinsic parameters of that word image. Whereas the geometric distortion and appearance of the word image are extrinsic parameters of the word image. This section discusses transcription and skeletonization.

Transcription is the process of converting an atomic word symbol into a sequence of character symbols that will be rendered. Formally, transcription can be said to convert a word symbol from a dictionary, $w \in D$, to a sequence of characters from an alphabet, $s_w \in \Sigma^*$, by a function $T:D \to \Sigma^*$.

The skeletonization function 102 converts a sequence of character symbols into a canonical word image. This step of rendering a canonical word image is referred to herein as skeletonization, which reflects the choice to use character skeletons to represent visual character symbols. Thus, skeletonization converts a sequence of characters from an alphabet, $s_w \in \Sigma^*$, to an image, $s:\Sigma^* \to B(I)$ where $B(I)$ is the set of bounded functions on the spatial image domain $I$. Below, the term $s \circ T$ is replaced with $s$, assuming that the input will be in the form of a character sequence.

Kerning

The kerning function 104 imposes spacing between characters, and it does so independent of the whichever font is used. The function s does not directly model kerning. Instead, the kerning operation is modeled as a function of the image produced by $s(w)$. The kerning function 104 converts an image with one spacing to an image with another spacing, which may be nonuniform between characters. The kerning can be different for identical word inputs. This variability is modeled with free parameters, $\theta \in \Theta\_k$, $k:(B,\Theta\_k) \to B$, where $k(\bullet,\theta)$ is an endomorphism of the image function domain for each $\theta$. Therefore, $k(\bullet;\theta) \circ s:D \to B$ returns a template image with a unique spacing encoded in $\theta$.

Font and Appearance

The canonical word image obtained by skeletonization and spacing of the kerning function is then subjected to purely local transformations, namely, the font function 106 and the appearance function 108, which produces the rendered text on a flat surface.

Font is the intrinsic shape of rendered text. For purposes herein, the appearance function 108 models lighting variations, shadows, and imaging artifacts such as blur. Appearance is an extrinsic feature while font is an intrinsic feature. The font is viewed as acting locally, widening curves, or elongating the skeleton characters at each point in the domain I. The f function encodes local deformations mapping the skeleton text to the font shape.

For purposes herein, "appearance" refers to the effects of extrinsic features of the text location and environment. This includes background appearance and clutter, cast shadows, image noise, rendering artifacts, and the like. However, for the compositional model described herein, appearance does not include geometric context or shape of the rendering surface in the model.

Font and appearance are independent of the word chosen, and the free parameters of font and appearance are modeled with a hidden variable domain $\Theta\_f$. Font can be modeled by a function $f:(B(I),\Theta\_f) \to B(I)$. To reflect the fact that naively disentangling appearance and font is ill-posed, the appearance function a is modeled on the parameter space $\Theta f$.

Geometric Distortion

The geometric distortion function 110 models distortion of text that arises primarily due to perspective distortion of planar geometry. The vast majority of text is rendered linearly onto planar surfaces, and so a homographic model is adapted for the geometric distortion function 110. Although homogeneous linear models are discussed herein, other models of geometric distortion may be used.

The rendering domain may be fixed to R=[0, 1, ..., 31]×[0, 1, ..., 255] to enable batching for training and to fit the dimensions of the input to the model. Note that the rendered image domain I may or may not be aligned with R. The geometric distortion acts on I, so it may be modelled as parametrically pulling back B(I) to B(g(I)): g(H)*(a∘f∘k∘s)(w)|x=[(a∘f∘k∘s)(w)]|H(x)—where H is a homography, and subscript indicates evaluation of the function at a point.

Although STNs (spatial transformer networks) have been used to model the geometries of the scenes in images, STNs have not previously been used to model geometric distortion due to mismatches between the prediction space of a text detector and the geometry of the scene. Furthermore, by specifically employing the relatively new IC-STN (inverse-compositional STN) that recursively computes distortion, larger distortions can be handled.

Complete Compositional Model

The complete compositional model models the text construction process for a given word using the five steps discussed above. The final image function is given by $$i=(g(H)*((a\circ f)(\cdot,\theta\_f)\circ k(\cdot,\theta\_k)\circ s))(w). \quad (1)$$

Having set forth a compositional model for text construction, the next section describes how the compositional model can be inverted.

Inverse Inference

Equation (1) can be inverted with an entangled combination of a CNN (convolutional neural network) and an RNN (recurrent NN). Note that with this approach, it can be difficult to quantify or theoretically conclude which components model which aspects of the text.

Next, four of the five functions are decomposed into distinct functions and a neural architecture design is set forth for estimating these inversion functions.

Geometric Rectification

Rectification can be implemented in a number of ways, including extracting and aligning keypoints or regions, unsupervised aligning to a corpus, and image-to-image alignment. However, because the text recognition problem involves a particularly constrained scenario, it is difficult to establish a canonical pose for keypoints without formulating the skeletonization process to account for keypoint variation, which would introduce additional free parameters and corresponding complexity. Image-to-image matching based on, for example, mutual information, is also difficult at this stage because the appearance features have not yet been normalized. Finally, alignment to a mean image or a corpus of images involves painstaking congealing optimization, which can make the solution slow and which is difficult to train end-to-end. Thus, the region-based alignment methods and an STN are practical for this work.

Incidentally, the affine patch-based MSER (maximally stable extremal regions) was compared with an STN solution. Specifically, the MSER was estimated within a contextual region around each word detection, and then rectified to a minimal enclosing oriented bounding box for the MSER. It was found that the STN provides a more reliable rectification module (test results are discussed below).

Geometric distortion is modeled by estimating a homography directly from the input pattern and from coordinates of a given input region of an image. In the general case, there is no additional observation beyond the word pattern supervision, so the parameters can be trained to the rectifier in a weakly supervised manner as outlined below. Thus, an inverse-composition STN (IC-STN) is a sound fit. Unlike prior approaches, this form of geometric modeling allows for recapturing missing parts of the image and does not depend on fiducial point estimates. Note that an IC-STN can be used to both correct distortion to text, correct noise in detections, and to canonicalize disparate geometric regions of training and testing data for cropping.

Figure 3:
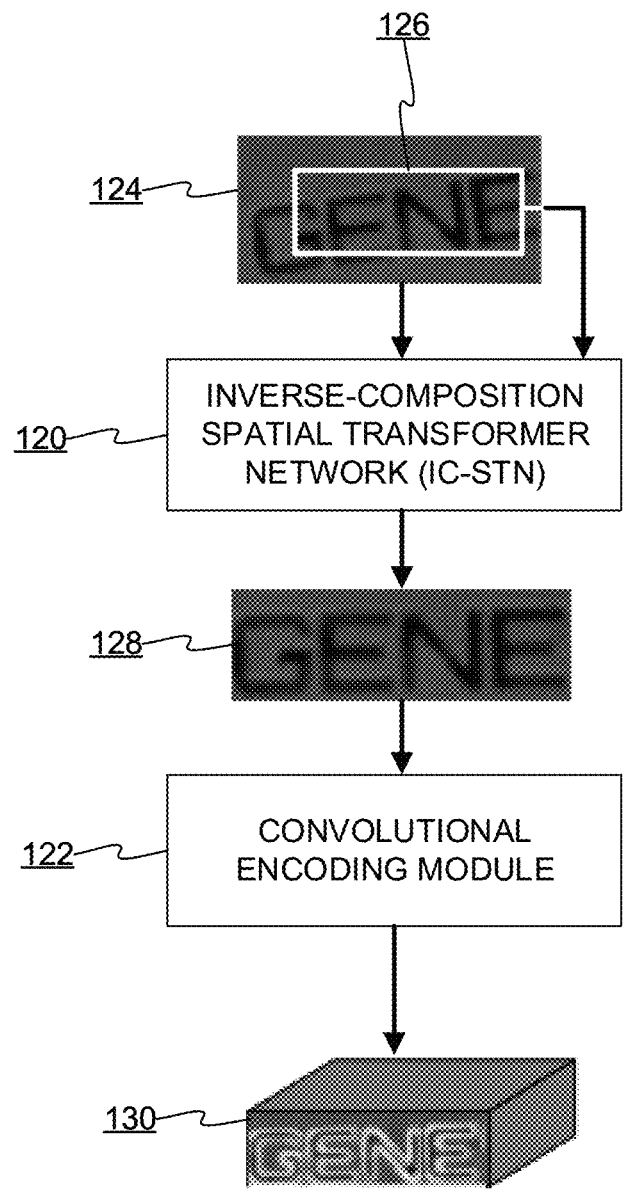
FIG. 3 shows interaction between a geometric rectification module and a convolutional encoding module.

FIG. 3 shows interaction between a geometric rectification module 120 and a convolutional encoding module 122. As shown in FIG. 3, the input to the geometric rectification module is an input image 124 and the coordinates of a text region 126. As output, the rectification module 120 outputs to the convolutional encoding module 122 a rectified crop 128 of the input image 124. The convolutional encoding module provides outputs 130 that can be decoded, as discussed below.

Appearance Featurization

As mentioned above, disentangling a∘f without additional supervision is ill-posed. The a and f functions may be grouped together and instead estimate (a∘f)−1. This can be done in many ways, but for most tasks, deep CNN features provide optimal performance. Thus, the font and appearance may be modeled with a state-of-the-art CNN such as Resnet-6. FIG. 3 depicts a CNN module.

Kerning Module

While the receptive field of each of the kernels in the relevant CNN feature-layers contain an appreciable context, modeling kerning with the feature CNN likely leads to entangled modeling and thus reduced performance on this task.

With that in mind, there are three main challenges to inverse inference of the kerning parameters:

(1) spacing may require a variable amount of context within each image (due to distortion), (2) spacing may require a variable amount of context for different images, and (3) features may not reflect the original spacing.

Item (1) may be addressed by the use of the geometric module in the front of whichever neural network is employed. Thus, the features returned from the Resnet-6 module, for instance, are in a canonical frame of reference. Item (2) is resolved by establishing an auxiliary loss function that encourages locality of the features. Item (3) may be resolved by explicitly modeling the context around each spacing element using a bidirectional long short-term memory (LSTM). An LSTM may be preferred because it robustly models contextual relationships in ordered data. The auxiliary mean squared error (MSE) loss, explained in more detail below, may be used to impose consistency on the output of the kerning-LSTM (kLSTM). Implementation of the LSTM is discussed below.

To employ an LSTM on the encoded text features, the text features are segmented along the x-axis with a sliding window having a width of 2 and a stride of 1. The windowed features (collections of feature vectors in the sliding moving window) are ordered from left to right in increasing x order. This corresponds to the time index. The LSTM takes the vectorized features as input and computes a new internal state and then operates on the next window. After a pass over all of the feature windows, the bidirectional LSTM operates in reverse order and takes as input the output of a previous cell. Finally, the reverse cells output next feature vectors that are concatenated to form a new feature encoding. See FIG. 4, discussed below. The output is fed into the recognition and reconstruction modules.

Figure 4:
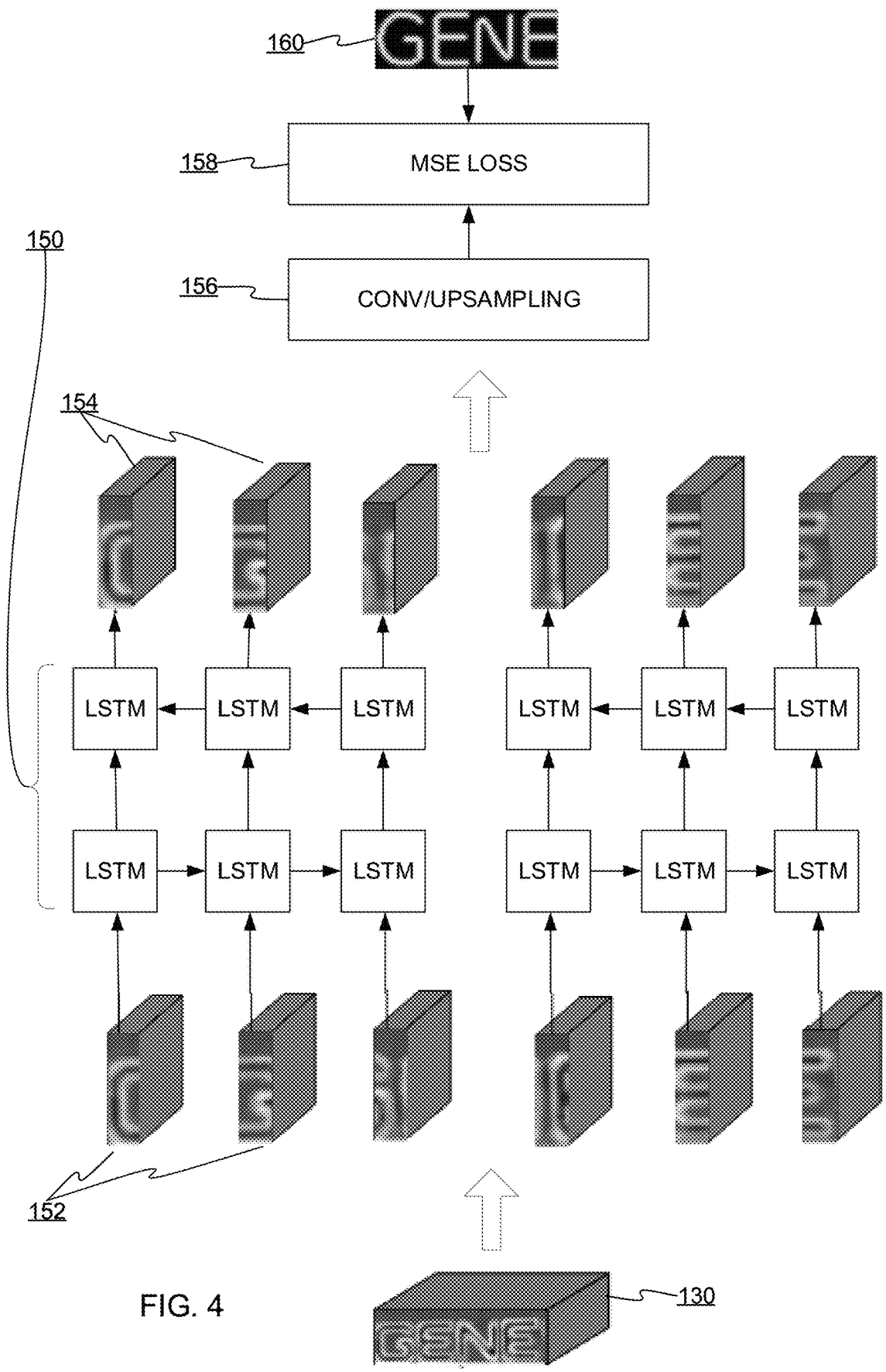
FIG. 4 shows a long short-term memory module.

FIG. 4 shows the kLSTM module 150. The inputs 152 to the kLSTM module 150 come from the outputs of the convolutional encoder module 122. The inputs 152 are windowed as described above and the LSTM is propagated forwards and backwards. The outputs 154 of the bidirectional kLSTM are concatenated and fed into the convolutional decoder 156 and the MSE loss 158 is computed against the ground truth skeleton 160.

Skeleton Reconstruction

To rebuild the skeleton from the rectified and de-kerned features, a deconvolutional architecture of three residual layers is employed, with spatial upsampling between each set of convolve, convolve, and add layers. This is designed to mirror the features in the encoding stage. Finally, a convolutional layer predicts the skeleton template. The ground truth template is compared with the prediction elementwise and the MSE loss is computed as outlined below.

Templates for the given transcription of ground truth word images are rendered with the following process. A font is chosen for the template; this will create a slight bias for the reconstruction task, so a standard font might be preferred. In one implementation, the Sans font in GNU GIMP (GNU image manipulation program) is used for template images. Given a font, the skeleton $S_k$ of the character images is computed for each character $c_k$. Finally, the function $T_k: I \rightarrow R: x \rightarrow \exp\{-d(x, S_k)^2/2\sigma^2\}$ is computed over a fixed image grid for each k. The term $\sigma$ is fixed to 1 pixel. Since there is some variation in the ligature between characters, as well as ascenders and descenders for each character, to fix kerning, all characters may be resized to consume the same amount of space in each template image (see FIG. 5).

Figure 5:
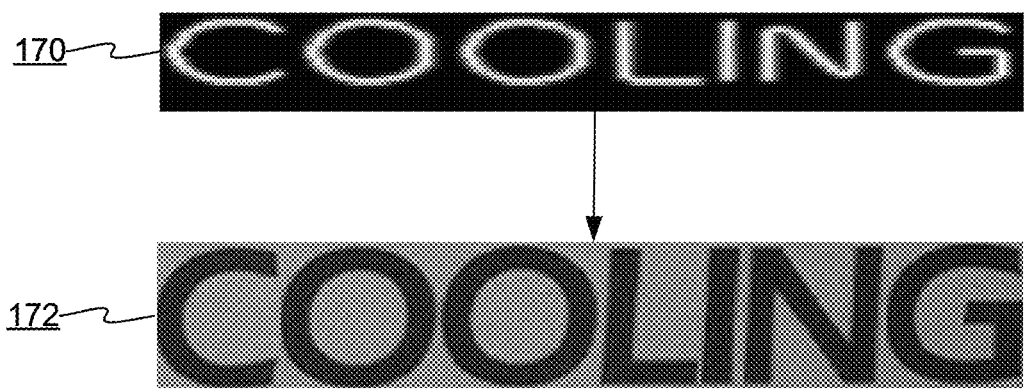
FIG. 5 shows example text images and template skeletons.
Figure 5:
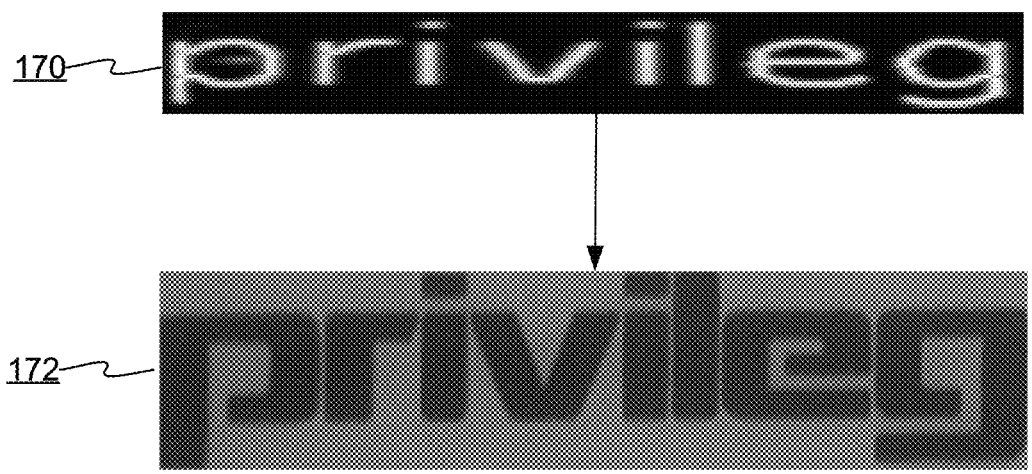

FIG. 5 shows example text images 170 and template skeletons 172. Using a template skeleton 172 provides several advantages for inverse inference on the components above. Registration can typically have trivial local minima without templates (normally MSE has trivial minima for joint registration, and a correlation-like loss must be employed). In addition, the kerning width is in terms of a fixed unit (the template kerning width). Finally, since the template skeletons are in terms of a fixed and clear font, legibility of the reconstruction implies that the features contain the information required to encode the characters for decoding. This provides another point of inspection for understanding the neural network.

Text Recognition

The text recognition module for the full compositional model takes its input from the kerning module. A residual layer and a convolutional layer are applied to adapt to the recognition problem. Finally, an LSTM is used to convert the convolutional spatial features into character probabilities. Specifically, a bidirectional LSTM is used without peephole connections, clipping, or projection with stride 8 (1) in pixel space (feature space). The bidirectional LSTM enables contextual information to propagate along with the hidden state from a symmetric horizontal window along the columnar features.

The next section discusses the functions used to drive the learning of the parameters of the inverse compositional modules.

Loss Functions

Two objectives are provided for the network: recognition and reconstruction. What follows is a review of the CTC recognition loss function and the reconstruction loss.

The CTC loss function operates on the output of the recognition LSTM. The CTC loss function produces a sequence of score vectors, or probability mass functions, across the codec labels. The conditional probability of the label given the prediction is the sum over all sequences leading to the label, given the mapping function B:

$$p(l \mid y) = \sum_{\pi : B(\pi) = l} p(\pi \mid y).$$

This probability can be computed using dynamic programming.

CTC loss allows the inverted transcription process to have many-to-one correspondences. By marginalizing over the paths through the sequence prediction matrix that output the target, using dynamic programming, the probability of the target sequence under the model parameters is obtained.

Mean Squared-Error Reconstruction Loss

The MSE reconstruction loss takes as input (i) the output of the decoder, (ii) the predicted template $S: I \rightarrow R$, and (iii) the ground truth template image $T: I \rightarrow R$ associated with the given word during training. See FIG. 4. The objective function for this task is $$L_{mse}(S, T) = \frac{1}{|I|} \|S - T\|_{L_2(I;R)}^2. \quad (2)$$

Emperical Studies

The performance of trained recognition embodiments described above were studied from the recognition standpoint and the end-to-end standpoint. Because the recognition stage is the main thrust of the embodiments described herein, the detector design is not evaluated. A faster RCNN-based multiscale detector was used. For comparison with previous end-to-end systems, the detector obtains recall of 90% and an F1-score of 92% on the ICDAR (International Conference on Document Analysis and Recognition) Focused test set.

In the experiments discussed below, the detector model was frozen and was not used to train the recognizer.

Ablation Experiments

The embodiments described herein feature several new components, such as the template prediction loss and IC-STN. Therefore, the performance of the model was tested under several architectures and loss balancing parameters. This validated the significance of each component.

End-to-End Evaluation

For an experiment to evaluate end-to-end performance, the base learning rate was set to 1×10−4 using exponential decay of the learning rate with a factor of 0.9 every 5000 iterations. The ADAM optimizer was used with $\beta_1$=0.5. The MLT Training dataset and the ICDAR Focused Training dataset were used for training the recognizer. Data augmentation was performed by the method described below, randomly perturbing the input coordinates, with a fixed $\sigma_p$=0.025.

FIG. 6 shows end-to-end F-scores 190 for the ICDAR 2013 Focused test set. The results of the ablation experiment show the significance of template reconstruction loss and spatial transformer and LTSM-based kerning modules. The models were trained under identical settings.

Robustness to Coordinate Perturbation

Although data augmentation is often used for training text recognition algorithms, the robustness of such algorithms in the face of perspective/geometric distortion is not known to have been studied. To that end, presented next is a comprehensive evaluation of the robustness of the compositional model under several ablations.

For each input coordinate pair $X_i$ in each bounding box $B_j$, a vector $\eta_i \sim N(0, \Sigma_p)$ is drawn. Then, for each box $B_j$ a translation vector $t_j \sim N(0, \Sigma_t)$ is drawn. Finally, for evaluation, the corrupted coordinates $\hat{X}_i^j = X_i + \eta_i + t_j$ replace the original coordinates in the input to the algorithm. Also, $\Sigma_t$, $\Sigma_p$ are chosen to be a diagonal matrix $\Sigma_t = \sigma_t \Sigma$, $\Sigma_p = \sigma_p \Sigma$, with $\Sigma_{11} \propto w$, $\Sigma_{22} \propto h$, and with the constants of proportionality $\sigma_t = \sigma_p$.

Figure 7:
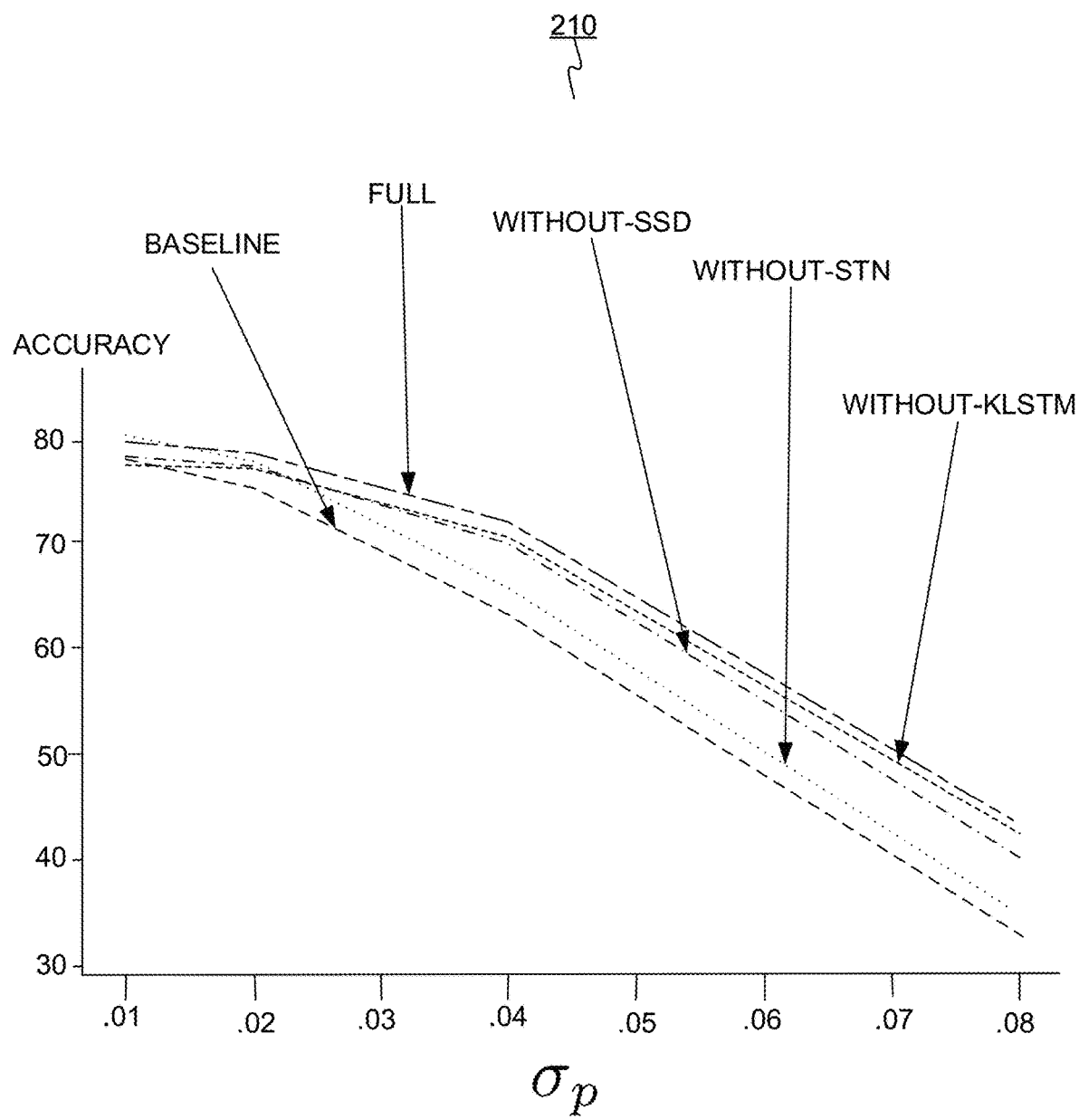
FIG. 7 shows a graph of results for different models.

FIG. 7 shows a graph 210 of results for different models. Specifically, ten experiments were performed at each noise setting and the mean and standard deviation of the accuracy were computed for each model on each perturbed test set. Graph 190 shows that the full model improves significantly on the baseline, without-STN, and without-SSD models for higher amounts of perturbation. This is further borne out in comparative end-to-end experiments.

As seen in FIG. 7, the accuracy of the various models from the ablation study are shown for various degrees of perturbation from the ground truth coordinates. In the graph 190, there is a large gap between models with and without an STN as the perturbation level rises.

Robustness to Kerning Variations

To evaluate the quality of kerning modeling, the ICDAR-13 Text Segmentation dataset was used. This dataset features character segments for each character in the word images. This provides an initial value for the spacing by computing the horizontal distance between the center of the enclosing bounding box of each segment. A sequence of images was then synthesized by re-parameterizing the x-axis of the image so that the number of non-character columns between each character is increased by a factor of 1+0.1*k*H, where H is the height of the cropped word image.

The next section discusses qualitative anecdotal evidence that the kLSTM module in the trained neural network 80 improves the quality of kerning modeling.

Comparative Evaluation

The full model was compared with state-of-the-art text recognition algorithms and end-to-end algorithms using the ICDAR Focused 2013 and Incidental 2015 datasets. The same trained network was used for all experiments, with no additional finetuning, limited to the training data provided for the end-to-end task, with the MLT 2017 training data included. For this experiment, the learning rate was initialized higher, to 5×10−4, since it was observed that the full model is more robust to swings in the early training stages. Additionally, a stagewise decay was employed by a factor of 0.1 after 10, 20, and 35 of the 50 epochs. A higher level of perturbation was incorporated, with $\sigma_p = \sigma_t = 0.05$.

Figure 8:
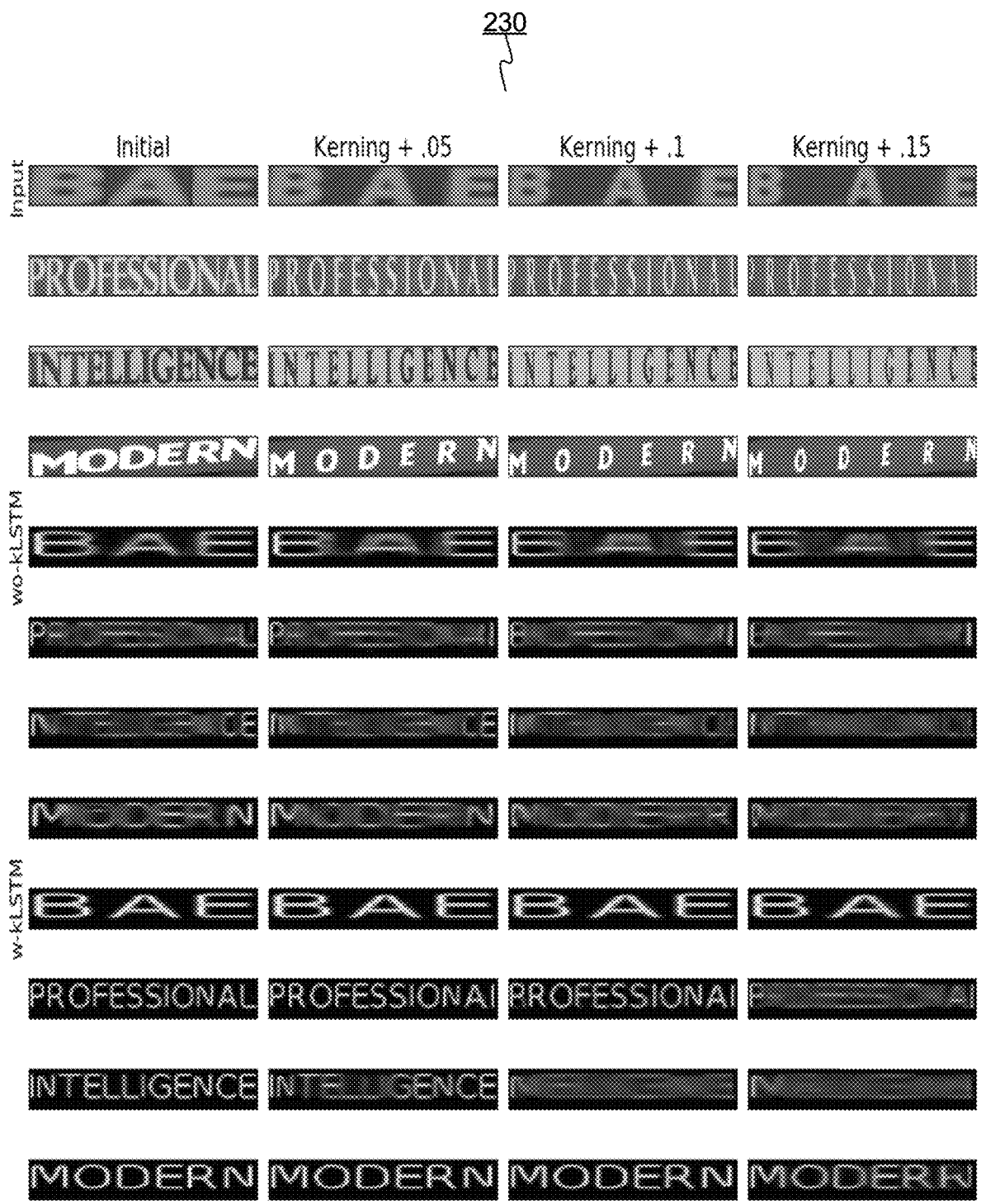
FIG. 8 shows examples.

FIG. 8 shows examples 230 anecdotally demonstrating that a bidirectional LSTM can model the kerning process. The kerning of each input image increases from left to right. The top four rows are the input images. The middle four rows are the predicted templates for a model without the LSTM. The bottom four rows are the predicted templates with the LSTM. While there are still failure cases for the full model, there is significant improvement over the model that lacks the LSTM.

Recognition

The trained neural network was tested on the ICDAR Focused 2013 (IC-13) and ICDAR Incidental (IC-IST) for this task. FIG. 9 shows comparative results on the recognition tasks. Specifically, FIG. 9 shows accuracy results 240 as tested with the 90K dictionary for the IC-13 and IC-IST recognition tasks.

End-to-End

Even though the system is not trained end-to-end, it exhibits the best performance on the minimally assisted Generic end-to-end task. The modest improvements for the assisted tasks may be due to detector performance. However, since this work showcases the second component in the system (the neural network 80), this was not studied in depth. FIG. 10 shows end-to-end comparative performance results 250 for top OCR algorithms. The 'G', 'W', and 'S' column headings indicate the lexicon used for each task (Generic, Weak, and Strong, respectively), and the column shows the F-score of the respective algorithm.

Figure 11:
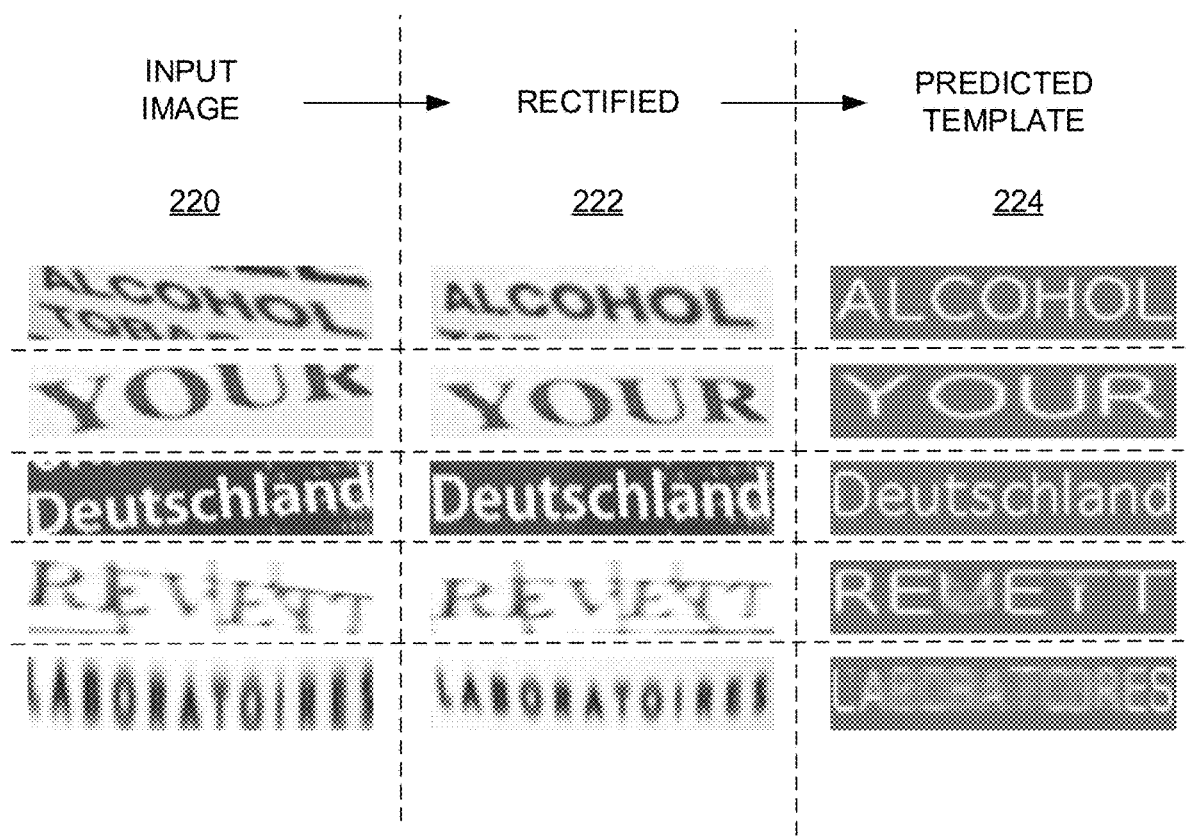
FIG. 11 shows example input images, rectified images, and predicted templates.

FIG. 11 shows example input images 270, rectified images 272, and predicted templates 274. The first three rows show input image examples that work well. The fourth row shows shortcomings of the featurization process, which indicates that explicit background modeling may lead to improvements. In the last row, it can be seen that out-of-model geometric transformations may also cause problems.

Summary

Optical character recognition (OCR) systems are known to be constrained by the initial detector stage. Previous work dealt with this by coupling the recognizer and detector closer together and aligning the input of the second stage to the first. Embodiments described herein offer an alternative strategy that involves training the recognizer to be capable of recovering missing text and aligning the input patterns from the first stage for itself. A full formulation of this based on a textual compositional model has been explained herein. Ablation studies discussed above have shown the relative importance of the components of the model, and comparative studies place the work disclosed relative to the growing body of text recognition and end-to-end OCR systems.

Conclusion

Figure 12:
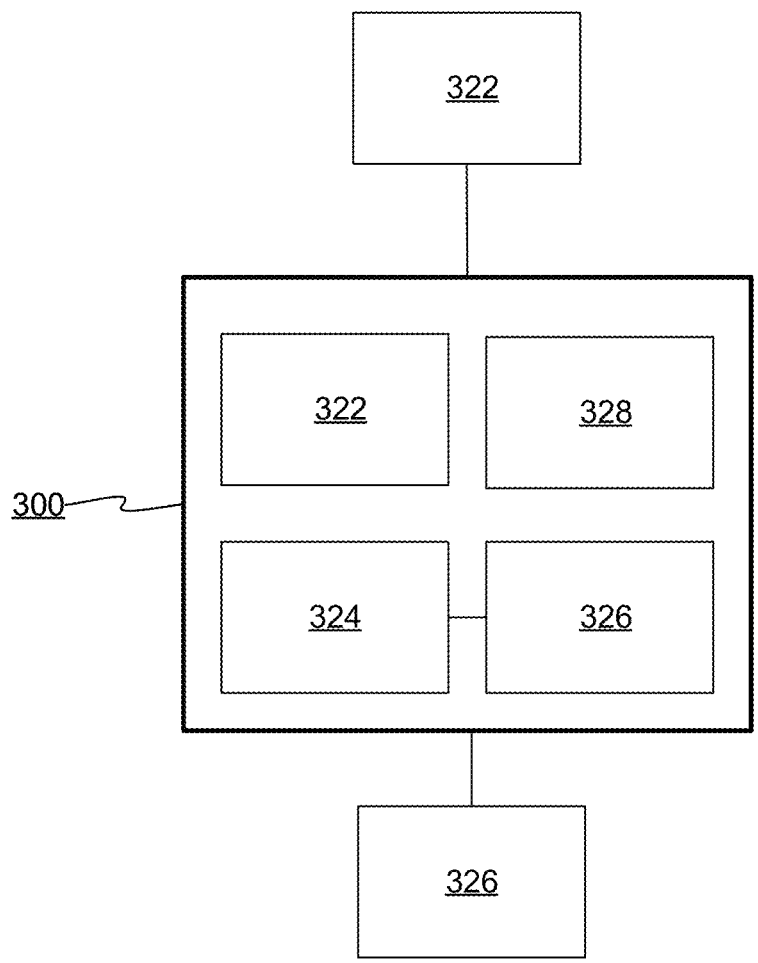
FIG. 12 shows details of a computing device.

FIG. 12 shows details of a computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device or host 300 (possibly via cloud APIs) to implement the embodiments described herein.

The computing device or host 300 may have one or more displays 322, a network interface 324 (or several), as well as storage hardware 326 and processing hardware 328, which may be a combination of any one or more of: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device or host 300 may cooperate in ways well understood in the art of machine computing. In addition, input devices may be integrated with or in communication with the computing device or host 300. The computing device or host 300 may have any form-factor or may be used in any type of encompassing device. The computing device or host 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computing devices, the method comprising:
   training a neural network with training data comprised of training images of training text and ground truth text that corresponds to the images of the training text, the trained neural network being configured to recognize text in images inputted thereto;
   receiving an image comprised of image data, the image including a region comprised of image data representing text;
   passing the image to a text detector that is distinct from the neural network;
   performing, by the text detector, text detection on the image to detect the region of the image, the text detector outputting a boundary corresponding to the detected region of the image;
   passing the image to the trained neural network; and
   passing the boundary to the trained neural network, wherein the trained neural network recognizes text in and around the region of the image corresponding to the boundary, and wherein the trained neural network adjusts the boundary while performing text recognition on the image.

2. A method according to claim 1, further comprising, based on the detection of the region, providing an indication of the region,
   wherein the trained neural network, after recognizing the text near the indicated region, outputs the recognized text and a rectification of the region to the nearby text.

3. A method according to claim 2, wherein the rectified region includes a portion of the image that was not included in the region detected by the text detection, wherein the portion of the image includes image data representing some of the recognized text, and wherein the portion is used by the neural network when recognizing the text.

4. A method according to claim 1, the trained neural network comprises modules or layers that correspond to an inverse of a compositional model, the compositional model modeling generation of word images from corresponding text.

5. A method according to claim 4, wherein the compositional model comprises a kerning function that models kerning of text.

6. A method according to claim 5, wherein the compositional model further comprises a composition of the kerning function, a skeletonization function, a font function, an appearance function, and a geometry function.

7. A method according to claim 1, wherein the trained neural network models geometric distortion of text and models noise of the text detection.

8. A computing device comprising:
   processing hardware;
   storage hardware storing information configured to, when executed by the processing hardware, cause the processing hardware to implement a text detector and a text recognizer;
   the text detector configured to detect, in images inputted thereto, regions containing text, and to output indicia of the regions to a trained neural network, the indicia including boundaries corresponding to the detected regions; and
   the trained neural network configured to receive the images and the indicia of the regions containing text detected by the text detector, recognize text associated with the detected regions corresponding to the boundaries, and adjust the boundaries while performing the text recognition, wherein the trained neural network comprises nodes and interconnections therebetween that have been trained to correspond to an inverse of a compositional model for generating images of text, the inverse of the compositional model comprising inversions of respective image-generation steps of the compositional model applied in an inverse order of the image-generation steps, and wherein the text detector is distinct from the trained neural network.

9. A computing device according to claim 8, wherein the compositional model comprises at least three of: a transcription and/or skeletonization function, a kerning function, a typesetting function, an appearance function, and a geometric distortion function.

10. A computing device according to claim 8, wherein the trained neural network comprises a geometric rectification module or layer, a typesetting module or layer, and a kerning module.

11. A computing device according to claim 8, wherein the trained neural network comprises a spatial transformer network (STN) module/layer feeding a convolutional encoding module/layer.

12. A computing device according to claim 11, wherein STN module/layer receives an image and an indication of a region of text therein and outputs, to the convolutional encoding module/layer, a rectified crop of the image.

13. A computing device according to claim 8, wherein the trained neural network comprises a convolutional encoding module/layer feeding a long short-term memory (LSTM) module/layer.

14. A computing device according to claim 13, wherein the trained neural network further comprises a STN module/layer that feeds the convolutional encoding module/layer.

15. A computing device according to claim 14, wherein the STN module/layer corrects distortion of text, corrects noise in detections, and canonicalizes disparate geometric regions of training and testing data for cropping, the convolutional encoding module/layer encodes text features, and the LSTM module/layer decodes the encoded text features.

16. A computing device according to claim 8, wherein the trained neural network comprises a text recognition module/layer that is directly or indirectly fed by an STN module.

17. Computer-readable storage hardware storing instructions configured to cause a computing device to perform a process, the process comprising:

providing a two-stage end-to-end text recognition system comprising a text detection stage and a text recognition stage, wherein images inputted to the text recognition system are provided to each of the text detection stage and the text recognition stage, wherein the text detection stage detects text regions in the images and provides the detected regions and boundaries corresponding to the detected regions to the text recognition stage, wherein there is end-to-end alignment between the text detection stage and the text recognition stage, wherein the text detection stage and text recognition stage are each trained independent of the other and include a text detector used for the text detection stage that is distinct from a neural network used for the text recognition stage, and wherein the text recognition stage is trained to perform geometric rectification on the text regions using the images and the boundaries, and adjusts the boundaries during the text recognition stage.

18. Computer-readable storage hardware according to claim 17, wherein the text recognition stage comprises a connectionist temporal classifier (CTC).

19. Computer-readable storage hardware according to claim 18, wherein the text recognition system further comprises a decoder and a recognition loss function that computes loss errors on outputs of the decoder.

20. Computer-readable storage hardware according to claim 17, wherein, for a given text region, when the text recognition stage recognizes text within the given text region, the text recognition stage recognizes portions of that text that are outside of and adjacent to the given text region, and wherein when the given text region is rectified the rectification of the given text region encompasses the portions of text.

* * * * *